(12) United States Patent
Stamps et al.

(10) Patent No.: US 8,047,466 B2
(45) Date of Patent: Nov. 1, 2011

(54) YOKE WITH NOTCHED ARM ROOTS

(75) Inventors: Frank B. Stamps, Colleyville, TX (US); Richard E. Rauber, Arlington, TX (US); Thomas C. Campbell, Keller, TX (US); Tom Donovan, Fort Worth, TX (US); Patrick R. Tisdale, Roanoke, TX (US); James Lee Braswell, Jr., Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 564 days.

(21) Appl. No.: 12/300,065

(22) PCT Filed: May 14, 2007

(86) PCT No.: PCT/US2007/011532
§ 371 (c)(1),
(2), (4) Date: Nov. 7, 2008

(87) PCT Pub. No.: WO2007/133735
PCT Pub. Date: Nov. 22, 2007

(65) Prior Publication Data
US 2009/0179107 A1 Jul. 16, 2009

(51) Int. Cl.
*B64C 27/52* (2006.01)
(52) U.S. Cl. .................................................. 244/17.25
(58) Field of Classification Search ............... 244/17.25; 416/134 A, 141
See application file for complete search history.

(56) References Cited

U.S. PATENT DOCUMENTS

| | | | | | |
|---|---|---|---|---|---|
| 4,427,340 | A | * | 1/1984 | Metzger et al. | 416/141 |
| 5,059,094 | A | * | 10/1991 | Robinson et al. | 416/134 A |
| 5,263,821 | A | * | 11/1993 | Noehren et al. | 416/97 R |
| 6,824,096 | B2 | * | 11/2004 | Zoppitelli et al. | 244/17.25 |
| 2006/0067822 | A1 | * | 3/2006 | D'Anna | 416/98 |
| 2009/0179107 | A1 | * | 7/2009 | Stamps et al. | 244/17.25 |

FOREIGN PATENT DOCUMENTS

EP 0097885 A2 1/1984

OTHER PUBLICATIONS

First Office Action from CN counterpart Application No. 200780017263.1, issued by the Patent Office of China on Nov. 5, 2010.
Canadian Office Action from CA counterpart Application No. 2650355, issued by the CA Intellectual Property Office on Feb. 25, 2011.
Japanese Office Action from JP counterpart Application No. 2009-509891, issued by the JP Patent Office Jun. 17, 2011.

* cited by examiner

*Primary Examiner* — Francis T Palo
(74) *Attorney, Agent, or Firm* — James E. Walton; Richard G. Eldredge

(57) ABSTRACT

A yoke for a rotary wing aircraft rotor system has a plurality of arms, each arm having a root. Each root has a notched portion configured to allow passage of a portion of a blade-pitch control system through the notched portion.

12 Claims, 3 Drawing Sheets

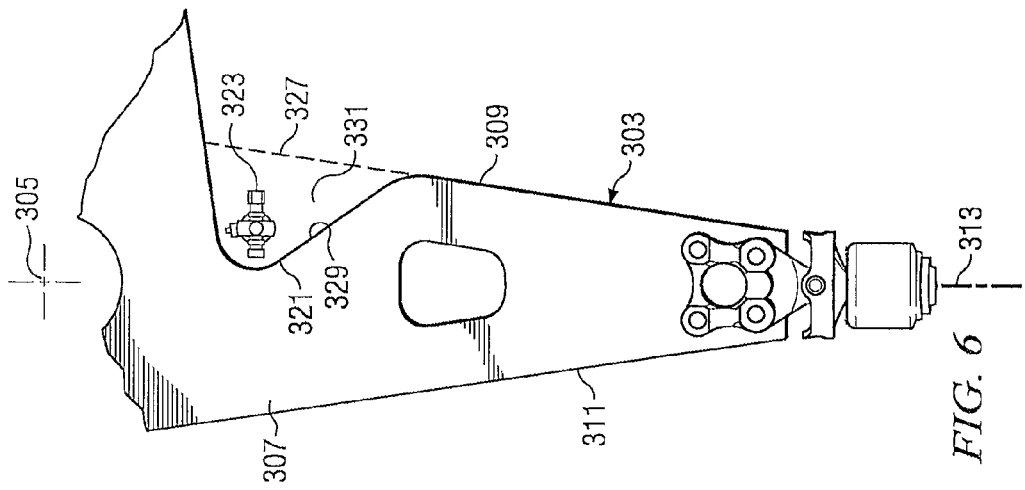
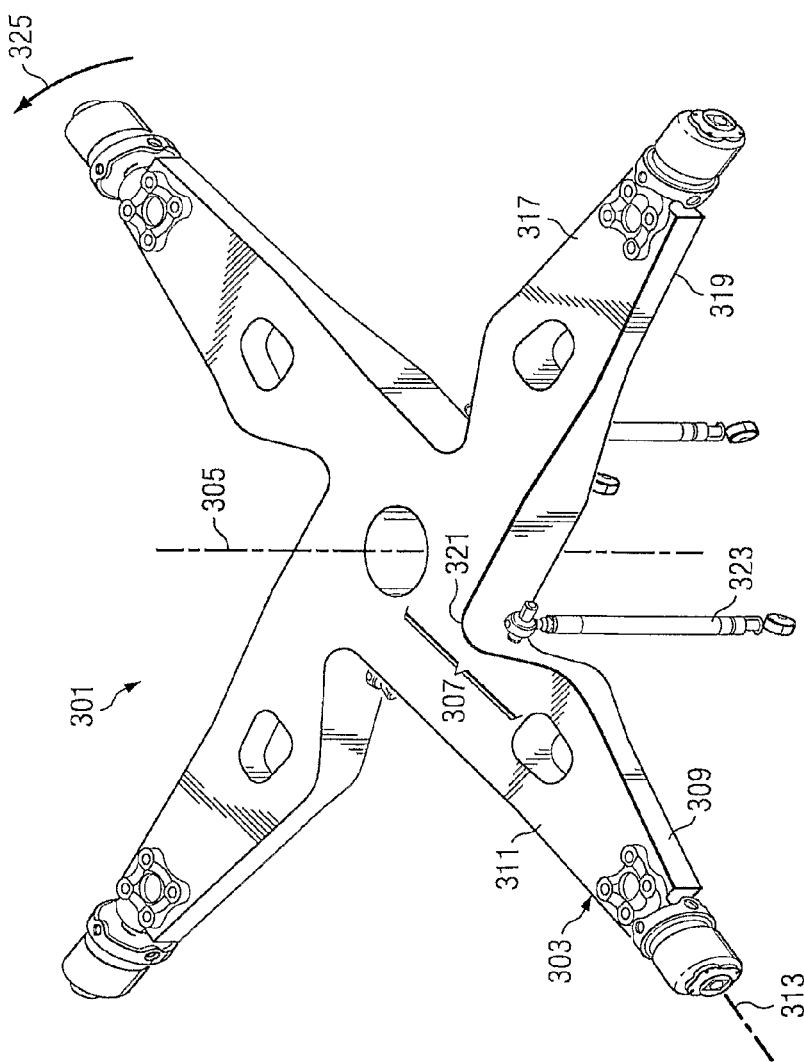

YOKE WITH NOTCHED ARM ROOTS

TECHNICAL FIELD

The technical field is rotor yokes for rotary-wing aircraft.

DESCRIPTION OF THE PRIOR ART

Rotary-wing aircraft, including helicopters and tiltrotors, have been around for many years, and there have been many designs of rotor hubs for rotary-wing aircraft. As consumer demand for faster and more powerful tiltrotor aircraft increases, the existing hub designs are reevaluated with an eye toward improving the overall performance of the aircraft. Conventional tiltrotor aircraft include two rotor systems, each having three rotor blades connected to a central yoke. Unfortunately, use of three blades per rotor system may not provide enough thrust to accommodate the larger, faster, more powerful tiltrotor aircraft desired by demanding consumers.

One way to achieve a more powerful and faster tiltrotor aircraft is to increase the number of rotor blades, and it may be advantageous to increase the number of rotor blades to four or more rotor blades per rotor system. However, designing a rotor system having four or more blades per rotor system presents significant challenges. One such challenge is related to positioning of pitch horns and pitch links, relative to the rotor system yoke, that provide the rotor system with desired values of delta-0 (pitch-cone coupling) and delta-3 (pitch-flap coupling) terms. This packaging/component location issue is a prevalent problem in designing four-bladed rotor systems for tiltrotor aircraft.

FIGS. 1 and 2 illustrate a prior-art yoke for a rotor system. Yoke 101 comprises four arms 103 extending generally radially from an axis of rotation 105. Arms 103 each have a root 107 located near axis 105, and root 107 is generally the widest portion of arms 103 as viewed from above. Each arm 103 comprises a leading edge 109 and a trailing edge 111, and each arm 103 has an associated pitch axis 113. Yoke 101 also comprises a top side 117 and a bottom side 119.

While yoke 101 follows traditional design tenants, yoke 101 is not convenient for component packaging requirements. In particular, portions of roots 107 obstruct the desired positioning of pitch links and pitch horns (not shown) between arms 103, necessitating new methods and components for varying the pitch of rotor blades (not shown).

BRIEF DESCRIPTION OF THE DRAWINGS

FIG. 5 is an oblique view of the yoke of FIG. 4.
FIG. 6 is an enlarged top view of a portion of the yoke of FIG. 4.

DESCRIPTION OF THE PREFERRED EMBODIMENT

A rotor yoke for a rotary-wing aircraft has notched arm roots that provide clearance for desired positioning of components of a flight control system. For example, the notches in the arms may provide for desired positioning of pitch links that are used to cause changes in the pitch angle of blades attached to the yoke. The positioning and orientation of the pitch links determines the delta-0 (pitch-cone coupling) and delta-3 (pitch-flap coupling) terms for the rotor system.

Figure 1:
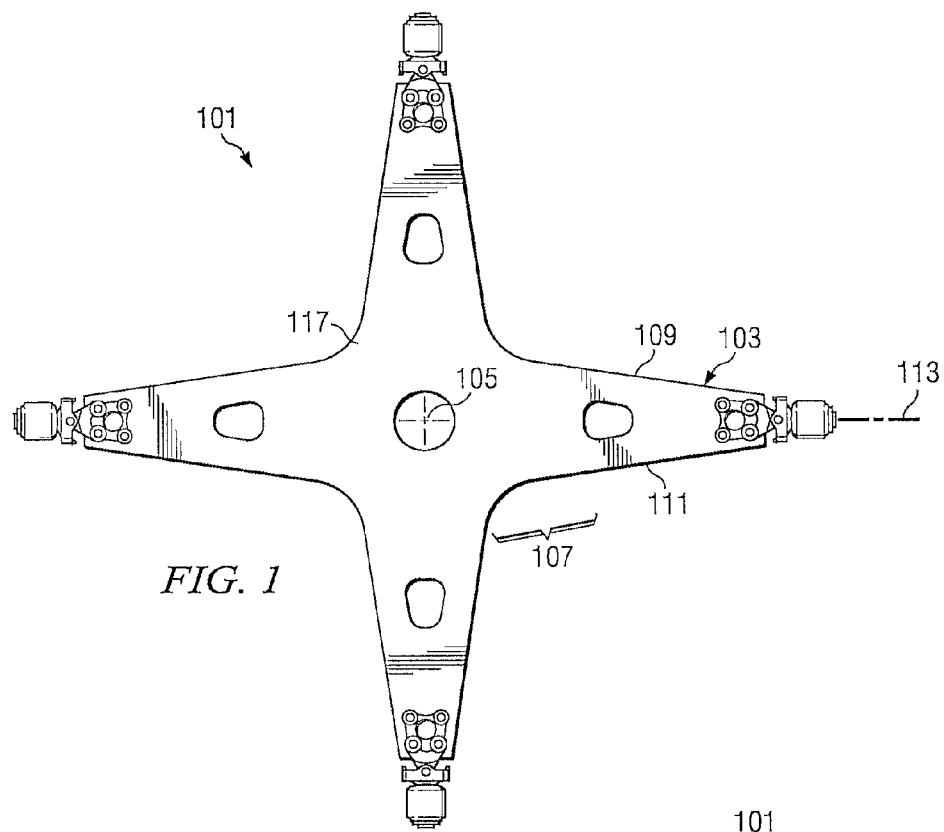
FIG. 1 is a top view of a conventional four-armed yoke.
Figure 2:
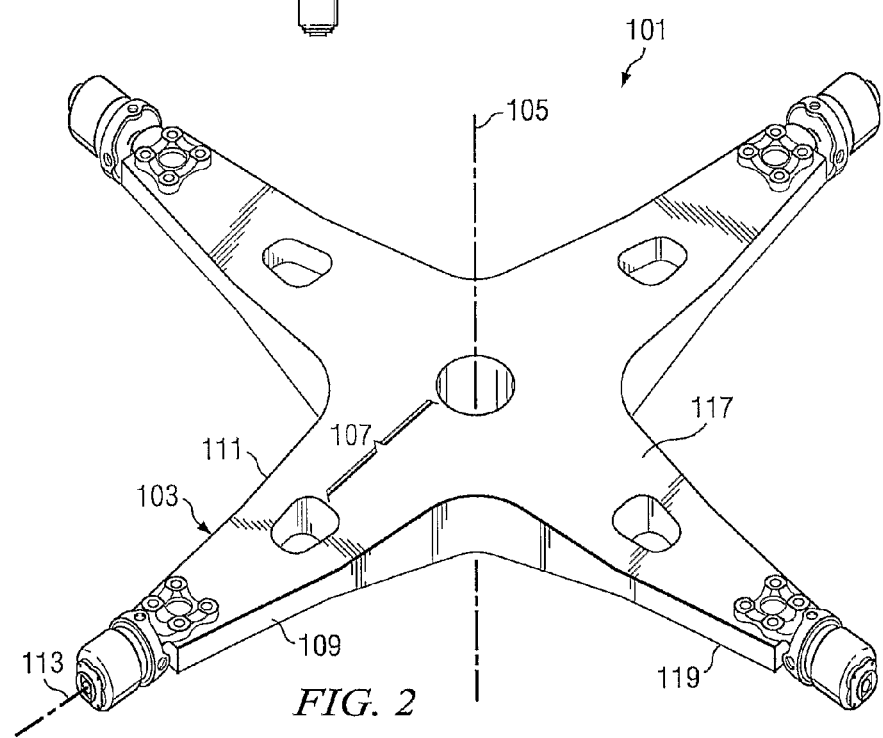
FIG. 2 is an oblique view of the yoke of FIG. 1.
Figure 3:
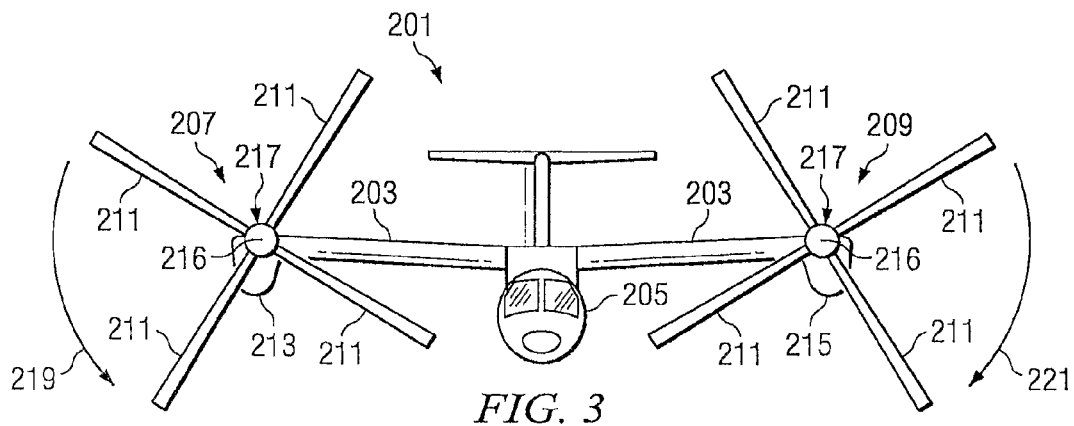
FIG. 3 is a front view of tiltrotor aircraft having a yoke according to an exemplary embodiment.

FIG. 3 illustrates a tiltrotor aircraft having four-blade rotors, each utilizing a yoke with notched arms, as described below. FIG. 3 illustrates a tiltrotor aircraft 201 in an airplane mode of flight operation, in which wings 203 are utilized to lift aircraft body 205 in forward flight. Aircraft 201 has two rotor systems 207, 209, each rotor system 207, 209 having four blades 211 and being driven in rotation by engines (not shown) carried within nacelles 213, 215. A spinning cover 216 is mounted on a forward portion of each rotor system 207, 209, and each cover 216 substantially encloses a four-armed yoke 217, obscuring four-armed yokes 217 from view in FIG. 3. Blades 211 are attached to yoke 217 of each rotor system 207, 209 in a manner that allows for each blade to rotate about an associated pitch axis. The arrow labeled with reference numeral 219 indicates that rotor system 207 rotates in the direction of arrow 219. Similarly, the arrow labeled with reference numeral 221 indicates that rotor system 209 rotates rotor blades 211 in the direction of arrow 221.

Figure 4:
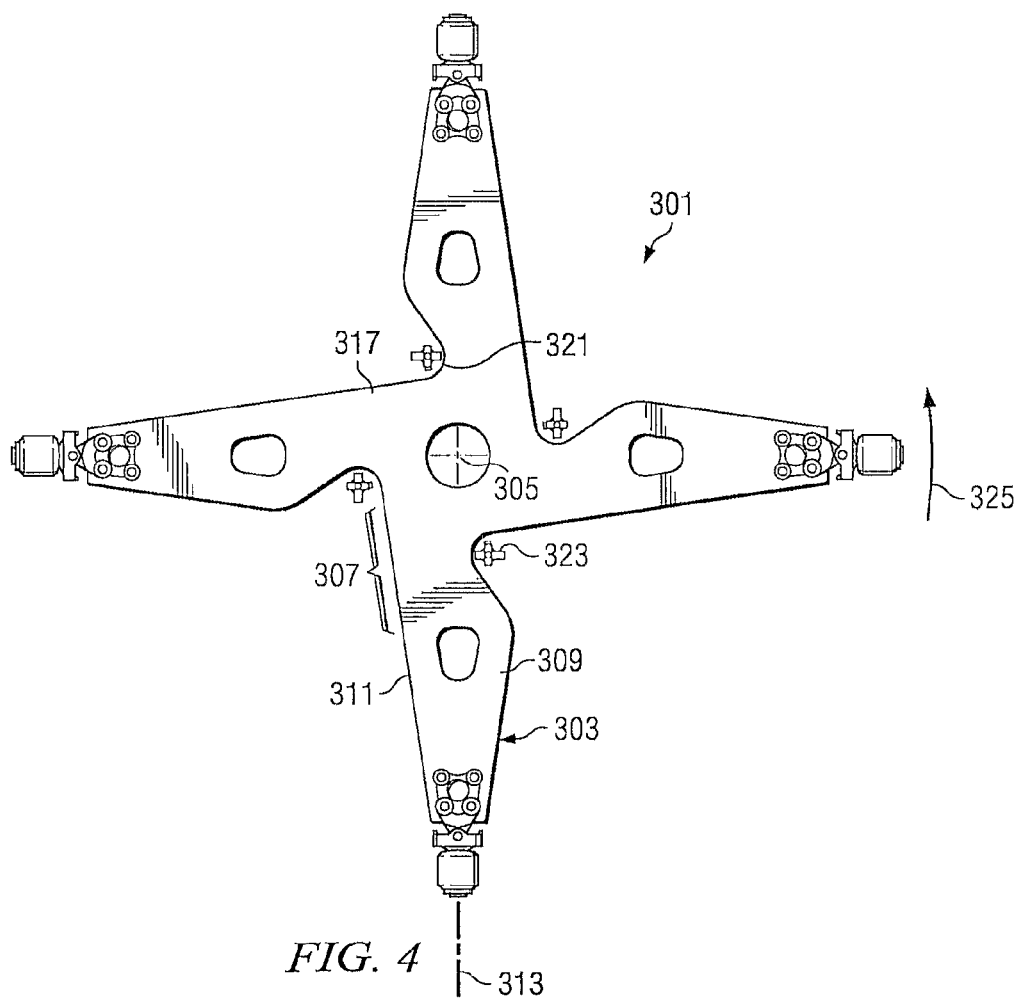
FIG. 4 is a top view of a yoke according to an exemplary embodiment.

FIGS. 4 through 6 illustrate an exemplary embodiment of a yoke with notched arms. Yoke 301 comprises four arms 303 extending generally radially from an axis of rotation 305. Arms 303 each have a root 307 located near axis 305, and roots 307 are generally the portion of arms 303 located nearest axis 305, as viewed from above. Each arm 303 comprises a leading edge 309 and a trailing edge 311, and each arm 303 has an associated pitch axis 313. Yoke 301 also comprises a top side 317 and a bottom side 319.

Each root 307 comprises a notch 321 that allows passage of a component of a flight control system into or through notch 321. For example, a component of a blade-pitch control system, such as pitch link 323, may be located within notch 321. Alternatively, pitch horns or other devices useful in varying the pitch of a rotor blade may be located within notch 321. By allowing passage of devices such as pitch link 323, desirable delta-0 and delta-3 angles are attainable. Each notch 321 allows the corresponding pitch link 323 to pass the adjacent arm 303, which provides an elegant solution to rotor hub component packaging difficulties for four-blade hubs for tiltrotor aircraft. Yoke 301 is adapted for primary rotation in the direction of the arrow labeled with reference numeral 325; however, a yoke may be formed substantially similar to yoke 301 but generally as a mirror image to yoke 301 for rotation in a direction opposite 325.

FIG. 6 is an enlarged top view of one arm 303 of yoke 301. An imaginary surface 327 is an imaginary extension of the surface of leading edge 309 toward the central portion of yoke 301, and the volume defined by notch wall 329 and surface 327 is a notch envelope 331. As shown in the figure, pitch link 323 is generally parallel to axis 305, and link 323 appears as fully within notch envelope 331 in a top view. In this configuration, link 323 extends into notch envelope 331 without intersecting imaginary surface 327. However, in other embodiments pitch link 323 may be oriented at other angles and may intersect imaginary surface 331 while extending into or through notch envelope 331. For the embodiment shown in the figures, it should be noted that each link 323 is positioned for attachment to a pitch horn used to control the pitch of a blade attached to the next adjacent arm 303 in the direction of rotation. In other words, pitch link 323 for a given blade is located in notch 321 in the leading edge of the adjacent trailing arm 303.

Notches 321 are configured to allow for centrifugal loads and other forces to pass between arms 303 and the remainder of yoke 301 through arm roots 307. Notches 321 are shaped so as to prevent the formation of stress concentrations in notches

321. Yoke 301 is preferably formed from fiber-reinforced composite materials, such as a fiberglass- or carbon fiber-reinforced material, and the orientation of fibers in the matrix around each notch 321 may be optimized based on the shape used for notches 321. Alternatively, yoke may be formed from other appropriate materials, such as a metal. In addition, alternative embodiments of yoke 301 may have arm roots 307 that are thicker in dimension from top side 317 to bottom side 319, or trailing edge 311 may be formed with additional material to provide for higher load capacity. It should be noted that notches 321 may be formed to have a shape different than that shown in the figures. Further alternative embodiments may include yokes configured to have two, three, or five or more notched arms.

Embodiments of a yoke with notched arms provide for several advantages, including: (1) improved delta-0 and delta-3 coupling terms; (2) reduced envelope requirements for pitch angle control system components; and (3) reduced mass and moments of inertia in the rotor system.

This description includes reference to an illustrative embodiment, but it is not intended to be construed in a limiting sense. Various modifications and combinations of the illustrative embodiments, as well as other embodiments, will be apparent to persons skilled in the art upon reference to the description.

The invention claimed is:

1. A yoke for a rotary-wing aircraft, the yoke comprising:
    a plurality of arms extending from a central portion, each arm having a root; and
    a notch formed in a leading edge or a trailing edge of each root and adapted to allow positioning of a portion of a blade-pitch control system within each notch.

2. The yoke according to claim 1, wherein the yoke is formed from a composite material.

3. The yoke according to claim 1, wherein each notch comprises a notch envelope defined by an imaginary continuation of the corresponding edge toward the central portion.

4. The yoke according to claim 1, wherein the yoke has four arms.

5. A rotor system for a rotary-wing aircraft, the rotor system comprising:
    a yoke having a plurality of arms extending from a central portion, each arm having a root;
    a blade-pitch control system; and
    a notch formed in a leading edge or a trailing edge of each root and configured to allow positioning of a portion of the blade-pitch control system within each notch.

6. The rotor system according to claim 5, wherein the yoke is formed from a composite material.

7. The rotor system according to claim 5, wherein each notch comprises a notch envelope defined by an imaginary continuation of the corresponding edge toward the central portion.

8. The rotor system according to claim 5, wherein the yoke has four arms.

9. A rotary-wing aircraft, comprising:
    at least one rotor system having a yoke with arms extending from a central portion, each arm having a notch in an arm root and a blade rotatably attached to the arm for allowing adjustable pitch of each blade; and
    a blade-pitch control system;
    wherein a portion of the blade-pitch control system is positioned within each notch.

10. The aircraft according to claim 9, wherein the yoke is formed from a composite material.

11. The aircraft according to claim 9, wherein each notch comprises a notch envelope defined by an imaginary continuation of a corresponding leading edge or trailing edge toward the central portion.

12. The aircraft according to claim 9, wherein the yoke has four arms.

* * * * *